United States Patent
Hartnack et al.

(10) Patent No.: US 6,955,862 B2
(45) Date of Patent: Oct. 18, 2005

(54) FUEL CELL BLOCK

(75) Inventors: Herbert Hartnack, Erlangen (DE); Josef Lersch, Heroldsbach (DE); Arno Mattejat, Bubenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 79 days.

(21) Appl. No.: 10/174,104

(22) Filed: Jun. 17, 2002

(65) Prior Publication Data

US 2002/0172854 A1 Nov. 21, 2002

Related U.S. Application Data

(63) Continuation of application No. PCT/DE00/04268, filed on Nov. 30, 2000.

(30) Foreign Application Priority Data

Dec. 16, 1999 (DE) .......................... 199 60 815

(51) Int. Cl.⁷ ................................. H01M 2/14
(52) U.S. Cl. ............................. 429/38; 429/39; 429/26
(58) Field of Search ............................. 429/32, 34, 38, 429/35, 26, 39

(56) References Cited

U.S. PATENT DOCUMENTS

| 4,124,478 A | | 11/1978 | Tsien et al. |
| 5,108,849 A | | 4/1992 | Watkins et al. |
| 5,472,801 A | * | 12/1995 | Mattejat et al. ................ 429/39 |
| 5,514,486 A | * | 5/1996 | Wilson ......................... 429/30 |
| 5,565,072 A | * | 10/1996 | Faita et al. .................. 204/256 |
| 5,750,281 A | | 5/1998 | Washington et al. |
| 6,007,933 A | * | 12/1999 | Jones .......................... 429/38 |

FOREIGN PATENT DOCUMENTS

| EP | 0 591 800 A1 | 4/1994 |
| WO | WO 96/20510 | 7/1996 |

* cited by examiner

*Primary Examiner*—Raymond Alejandro
(74) *Attorney, Agent, or Firm*—Laurence A. Greenberg; Werner H. Stemer; Ralph E. Locher (57) ABSTRACT

The fuel cell block has stacked elements. At least two adjacent elements define an intermediate space between them. Radial channels are formed between the two elements or in one of the elements. The radial channels connect the space to an axial channel through the stack. At least one of the radial channels is a blind channel which, in contrast with the other radial channels, does not allow fluid communication between the space and the axial channel. The number of radial channels that are configured as blind channels influences the quantity of operating medium flowing through the intermediate space.

18 Claims, 5 Drawing Sheets

FUEL CELL BLOCK

CROSS-REFERENCE TO RELATED APPLICATION

This application is a continuation of copending International Application No. PCT/DE00/04268, filed Nov. 30, 2000, which designated the United States and which was not published in English.

BACKGROUND OF THE INVENTION

Field of the Invention

The invention relates to a fuel cell block, which comprises elements arranged in a stack and a number of axial passages running through the elements in the stack direction, at least two adjacent elements forming a space between them, and a number of radial passages, which are connected to the space, being configured between the two elements or in one of the two elements, a number of which radial passages connect the space to at least one axial passage, so that a gaseous or liquid medium can flow from the axial passage to the space or vice versa.

During the electrolysis of water, the water molecules are broken down by electric current into hydrogen ($H_2$) and oxygen ($O_2$). In a fuel cell, inter alia this process takes place in reverse. Electrochemical combining of hydrogen and oxygen to form water forms electric current with a high efficiency and, if pure hydrogen is used as fuel gas, also without the emission of pollutants and carbon dioxide ($CO_2$). Even with a technical-grade fuel gas, for example natural gas or coal gas and with air instead of pure oxygen, wherein case the air may additionally be enriched with oxygen, a fuel cell generates considerably fewer pollutants and less carbon dioxide than other energy generators which operate with fossil energy carriers.

Technical implementation of the principle of the fuel cell has led to various solutions, specifically with different types of electrolytes and with operating temperatures of between 80° C. and 1000° C. The fuel cells are classified as low-temperature, medium-temperature and high-temperature fuel cells, depending on their operating temperature, and these categories can also be distinguished from one another through different technical embodiments.

An individual fuel cell supplies an operating voltage of at most 1.1 volts. Therefore, a multiplicity of fuel cells are stacked on top of one another and combined to form a fuel cell block. In the pertinent technical literature, a block of this type is also known as a stack. Connecting the fuel cells of the fuel cell block in series allows the operating voltage of a fuel cell installation to be several hundred volts.

In a fuel cell block, different elements are stacked on top of one another in an alternating order. Examples of such elements are electrolyte-electrode assemblies and bipolar plates. The stacking results in the creation of a stack direction which runs substantially perpendicular to the plane of the planar elements. Depending on the particular design of the fuel cell block, there are further elements, such as for example pressure cushions, electrically conductive layers or seals, between an electrolyte-electrode assembly and a bipolar plate. Depending on the type of fuel cells, the bipolar plate is designed, for example, as a composite conductor plate or as a cooling element which comprises two plates stacked on top of one another with a cooling-water chamber between them.

Liquid and gas chambers are arranged between the stacked elements of the fuel cell block. They are supplied with liquid or gas by axial passages. The axial passages in this case run substantially parallel to the stack direction of the fuel cell block, i.e. perpendicular to the plane of the stacked plate-like elements. The connection between an axial passage and the individual liquid or gas chambers is produced by radial passages which run substantially in the plane of the elements. Fuel cell blocks which have this type of structure are known, for example, from European patent EP 0 591 800 B1 (U.S. Pat. No. 5,472,801) and international PCT publication WO 96/20510.

The radial passages are formed as bores or grooves in elements of the fuel cell block, for example the bipolar plates. The design of the radial passages defines the way wherein an axial passage is linked to a gas or liquid chamber, and therefore the-function of the axial passage. For example, if a space between two elements which is designed as a cooling-water chamber is connected to an axial passage, this axial passage can, of course, only be used to carry cooling liquid.

Depending on the layout and design of the fuel cell block in terms of its nature, size or output, different levels of incoming flow of liquids or operating gases to the fuel cells are required. To cope with such differences, it is necessary to machine different radial passages into the respective elements of different fuel cell blocks. This makes production of a number of different types of fuel cell blocks complex.

Even the production of a single type of a fuel cell block is complex if different fuel cells within a fuel cell block have to be supplied with different liquid or gas flows. In this case, the fuel cell block accommodates elements of a similar type, for example cooling elements, which are manufactured differently by having differently configured radial passages.

SUMMARY OF THE INVENTION

It is accordingly an object of the invention to provide a fuel cell block, which overcomes the above-mentioned disadvantages of the heretofore-known devices and methods of this general type and which can be produced easily and inexpensively despite different demands being imposed on different fuel cells.

With the foregoing and other objects in view there is provided, in accordance with the invention, a fuel cell block, comprising:

a stack formed of a plurality of elements and axial passages formed through the elements in an axial stack direction;

at least two adjacent elements defining a space therebetween and a plurality of radial passages, communicating with the space and being formed between the two elements or in one of the two elements;

a plurality of the radial passages connecting the space to at least one of the axial passages for exchanging fluid medium between the at least one axial passage and the space, and at least one of the radial passages forming a blind passage not forming a connection to a respective the axial passage.

In other words, the objects of the invention are achieved by a fuel cell block of the type described above which, according to the invention, has at least one radial passage which is designed as a blind passage and does not produce a connection to an axial passage.

The term radial passage is understood as meaning a passage which runs in the plane of the planar elements. However, it may also run only substantially in the plane of an element or even between two elements and in part of its profile may break out of this plane, for example in order to penetrate through an element so as to pass into an element above or below it or in order to pass between two elements.

In a first step, the invention is based on the consideration that the drawbacks of a fuel cell block according to the prior art which have been described above are eliminated if it is not the radial passages themselves, but rather only the connection between radial passage and axial passage which is designed according to the requirements of the various fuel cells. This means that the flow of medium is no longer dependent on the design of the radial passages and therefore of the element as a whole, but rather only on the design of the connection between the radial passages and the axial passage.

In a second step, the invention is based on the consideration that a plurality of radial passages lead from the space toward the axial passage, and although all the radial passages are connected to the space, not all the radial passages are connected to the axial passage. The flow of medium between axial passage and space differs according to the number of radial passages which are connected to the axial passage. If large numbers of radial passages are connected to the axial passage, thus producing a connection between axial passage and space, a correspondingly large amount of liquid or gaseous medium can flow from the axial passage to the space or vice versa. If only a few radial passages are connected to the axial passage, the flow between axial passage and space is correspondingly inhibited. The invention is also based on the consideration that, if only a single radial passage runs from the space to the axial passage, the connection between the radial passage and the axial passage is the decisive factor in determining whether or not a medium can flow from the axial passage to the space or vice versa.

In a third step, the invention is based on the consideration that a connection between the radial passage and the axial passage is made variable if at least one radial passage is designed as a blind passage and does not form a connection to an axial passage. The end of the blind passage can be opened if required. An opening of this type is made, for example, by drilling open the end of a blind passage, thus producing the connection between the radial passage and the axial passage. The radial passage can also be opened out into the axial passage by cutting out an axial passage located in the element in such a manner that the closed end of the blind passage is cut off. The result of this is that the level of flow of the medium between axial passage and space can be decisively influenced by opening up a defined number of radial passages which are designed as blind passages.

The result of the invention is that it is no longer necessary for elements of a similar type, for example the cooling elements, to be produced in different designs in order to produce different fuel cell blocks whose fuel cells require a different level of flow of the medium. During the production process of the elements, each element of the same type is designed identically. The pre-established level of flow between the space between two elements and an axial passage is produced by subsequently opening up the corresponding numbers of radial passages which have been designed as blind passages. In a corresponding way, it is also possible to produce a fuel cell block in such a manner that a single axial passage is connected to different spaces in such a way that the level of flow from the axial passage to each space is not identical. Depending on the position of the space in the fuel cell block, the space can be supplied with more or less medium as a result of more or fewer radial passages being opened up.

In accordance with an advantageous configuration of the invention, the blind passage ends in the immediate vicinity of an axial passage. In this way, it is possible to connect more or fewer radial passages to the axial passage depending on the cross section of the axial passage. For example, if the axial passage has a small cross section, more radial passages end in a blind passage without opening out into the axial passage. If the axial passage has a large cross section, fewer or even no radial passages end in a blind passage without opening out into the axial passage. In this embodiment of the invention, the configuration of the connection between the axial passage and the radial passages is easy to produce by cutting or stamping the axial passage with a predetermined cross section.

An advantageous distance between the end of the blind passage and the axial passage is 1 mm to 50 mm (0.04–2 inches). With a distance of this type, it is possible to produce the connection between the radial passages and the axial passage by varying the cross section of the axial passage, and therefore in a simple way.

In accordance with an additional feature of the invention, the axial passage is connected to the space by at least one radial passage. A space which has been connected to the axial passage by a radial passage in this way is not connected to the axial passage to its maximum degree, but rather only partially. The possibility of only partially connecting a space to an axial passage opens up hitherto undiscovered possibilities for the use of an axial passage. For example, an axial passage of this type may be used as a venting passage for a space through which liquid flows and to carry away undesired air bubbles. The fact that the axial passage is only connected to the space by one or a few radial passages, i.e. only in part, prevents relatively large quantities of the liquid from being able to pass undesirably from the space into the axial passage.

An axial passage which is connected to the space by only one or a few radial passages can also be used to ensure that increased amounts of medium flow through certain regions of the space through which without this axial passage the flow of medium would not be so great. If various radial passages are connected to various parts of the space, an axial passage of this type can ensure that medium only flows selectively through predetermined parts of the space. The result is a deliberate spatial selection of which parts of the space medium flows through.

In accordance with another feature of the invention, the axial passage is not connected to any radial passage, but rather is separated in a gastight manner from the space. An axial passage of this type can be used to carry a medium which is not to flow through the space.

In accordance with a further advantageous configuration of the invention, the axial passage is separated in a gastight manner from all the spaces, formed between two adjacent elements, of the fuel cell block. An axial passage of this type can be used, for example, as a passage for carrying a further medium which is not passed directly through the spaces. Operation of a fuel cell block requires a large number of media to be guided in and around the fuel cell block. Each of these carried media require a passage or a line. Therefore, a fuel cell block has a multiplicity of passages or lines. Since in certain embodiments of a fuel cell, for reasons of symmetry more axial passages can be introduced within the elements which form the fuel cell than strictly necessary for carrying operating and cooling agents, it is sensible for these axial passages to be used to carry further media. This makes it possible to eliminate a line which was previously guided outside the fuel cells. This saves costs and reduces the volume of the fuel cell block.

In accordance with yet a further advantageous configuration of the invention, the elements which form the space are in each case formed from a central subelement and at least one peripheral sub-element, with the axial passages running through the peripheral subelement. In the finished state of the fuel cell block, the central subelement and the at least one peripheral subelement are joined to form one element. This joining may be effected, for example, by a plug connection or by adhesive bonding or by welding. Such a structure of an element has the advantage that the central subelement can be produced in the same design for a wide range of different fuel cell blocks. This makes mass production of the elements considerably less expensive. Only the peripheral elements have to be adapted to the requirements of the particular fuel cell block of which they are to become a component. This considerably simplifies the process of producing elements for a fuel cell block.

A further advantage can be achieved by the respective cross section of at least one axial passage differing in different elements of the same type. An axial passage arranged inside the elements passes through a large number of elements of the same type, for example a large number of bipolar plates or cooling components. Depending on the position of the elements within the fuel cell block, it is possible for the spaces which form the elements to be supplied with a different level of flow of medium. With the suitable design of the radial passages described above, the shape and size of the cross section of the axial passage is responsible for the number of radial passages which are connected to the axial passage.

In this way, varying the cross section of the axial passage in different elements of the same type leads to the spaces which are formed by the elements being supplied with a different level of flow of medium.

The elements which form the space are preferably two metallic plates which are connected to one another. The radial passages are predetermined, for example as grooves in at least one of the plates or, in an even simpler arrangement, by the shape of the plates. A simple way of producing the shape of such plates is to deep-draw the plates, allowing such plates to be produced very quickly and inexpensively. However, with a process of this type the deep-drawing tools are very expensive. The invention provides the advantage that different fuel cell blocks only require elements of the same form, which means that all these elements can be produced using only one set of deep-drawing tools. This considerably reduces the production costs of the elements.

In an expedient configuration of the invention, the plates are connected to one another by at least one weld seam. A connection of this type makes it possible to produce a gas-tight space between two plates particularly easily and effectively. However, it is also possible for the plates to be connected to one another by adhesive bonding.

A further advantage can be achieved by arranging a weld seam between an axial passage and the end of the blind passage. A weld seam of this type separates the blind passage from the axial passage. If the blind passage is to be opened up to form a radial passage which opens into the axial passage, the weld seam can easily be opened up, for example by cutting out part of the weld seam, without the stability of the element as a whole being impaired.

It is advantageous for at least one axial passage to be separated in a gastight manner from the space by a weld seam which runs around the axial passage. In this configuration of the invention, no radial passage opens out into the axial passage. As a result, the axial passage can be used to carry a further medium which is not to flow through the space.

In a preferred embodiment of the invention, the plates which form the space form a cooling element. A cooling element of this type is used to dissipate excess heat from the fuel cell(s) assigned to the cooling element. Depending on the position of a fuel cell within the fuel cell block or depending on the size and output of the fuel cell block, the fuel cell generate a different amount of heat which has to be dissipated. The invention makes it possible to adapt the flow of cooling water through the cooling element to the output which the fuel cell is able to generate in operation. Moreover, an axial passage can be used as a venting passage or the flow of medium through regions of the space where flow is particularly poor can be improved by a partially connected axial passage.

The space is expediently designed to carry cooling water when the fuel cell block is operating. Depending on the design of the space, defined regions of the space are connected to in each case defined radial passages. Selective connection of the radial passages to the axial passage means that it is possible for cooling water to be allowed to flow selectively, in a targeted fashion, through specific regions.

In a further configuration of the invention, the space is designed to carry an operating gas when the fuel cell block is operating. Depending on the load on a cell, which is dependent on the position of the cell within the fuel cell block, or depending on the nature of the operating gas, more or less operating gas is applied to the space through connection of more or fewer radial passages to an axial passage. If the fuel cell is operated, for example, with pure oxygen, in volumetric terms less operating gas is to be supplied to a space than if the fuel cell is operated with air.

Other features which are considered as characteristic for the invention are set forth in the appended claims.

Although the invention is illustrated and described herein as embodied in a fuel cell block, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
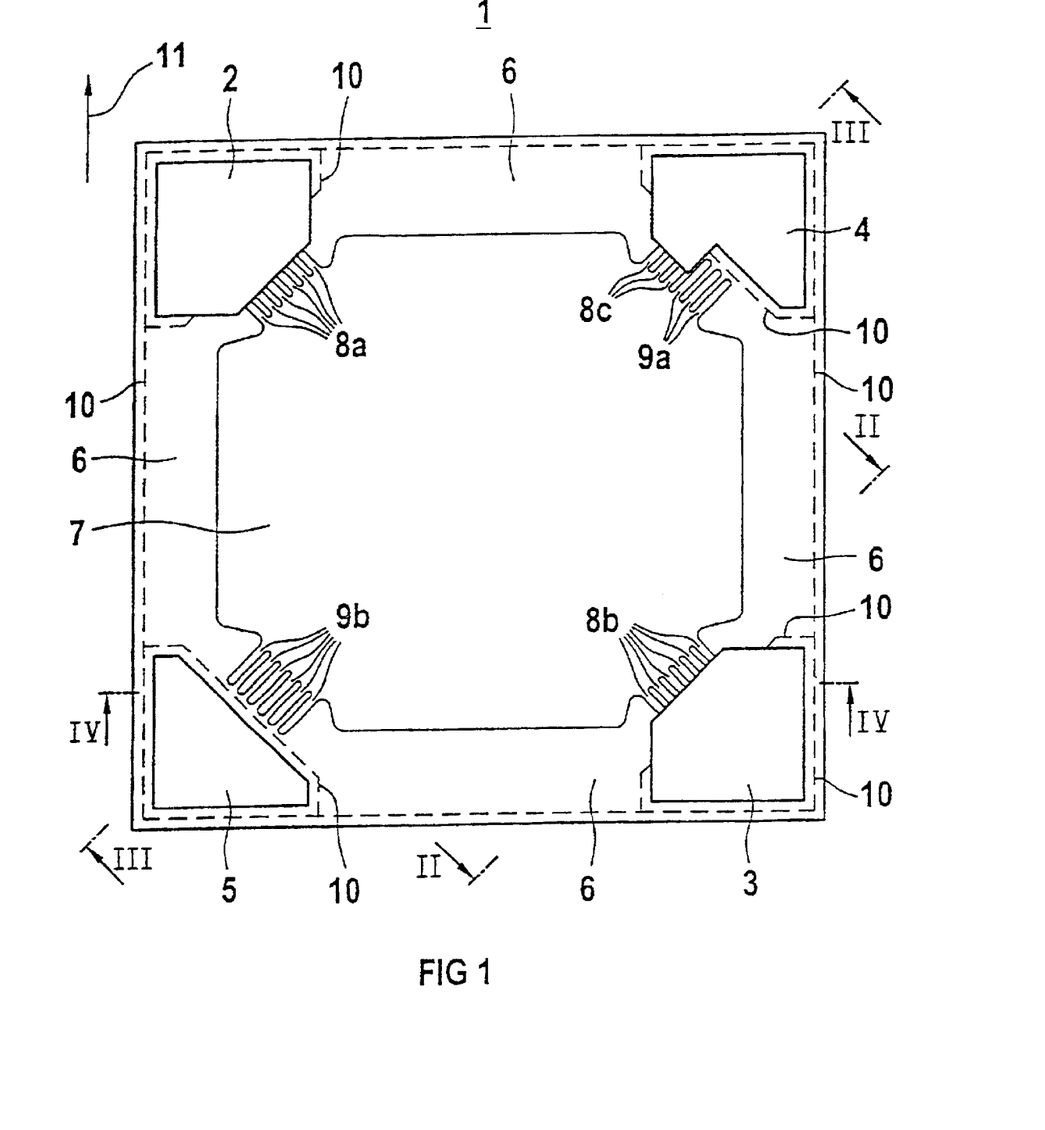
FIG. 1 shows a plan view of an element of a fuel cell block which, in combination with a further element of the fuel cell block, forms both a space and radial passages.

Referring now to the figures of the drawing in detail and first, particularly, to FIG. 1 thereof, there is shown an element 1 which is designed as a metallic plate of a cooling element. The cooling element is formed by the element 1 and a further plate, which is symmetrical with respect to the element 1, rests on the element 1 and is not shown in FIG. 1. The element 1 is produced by deep-drawing and has the following features:

a) four regions which are cut out of the plate and, in combination with further elements which are of a similar type to the element 1 and the seals between the elements, form four axial passages 2, 3, 4 and 5;

b) an edge region 6;

c) a region which is configured as a recess 7 with respect to the edge region 6, the recess, together with the further element which is symmetrical with respect to the element 1, forming a space 7;

d) a number of radial passages 8a, 8b, 8c, which connect the space 7 to the axial passages 2, 3 and 4;

e) a number of radial passages, which are designed as blind passages 9a, 9b;

f) a plurality of regions of linear configuration, which are illustrated as a dashed line in FIG. 1 and are prepared for application of a weld seam 10 which connects the element 1 to the element which is symmetrical with respect to the element 1 in the finished fuel cell block.

In the assembled state, the cooling element, of which the element 1 forms part, is arranged in a fuel cell block in such a manner that cooling liquid flows through the axial passage 2. The axial passage 2 is connected to six radial passages 8a, in such a manner that the cooling liquid flows out of the axial passage 2 through the radial passages 8a into the space 7. The cooling liquid flows through the space 7 and leaves the space 7 through the six radial passages 8b which connect the axial passage 3 to the space 7. The axial passage 3 passes the cooling liquid to a non-illustrated heat exchanger, wherein the cooling liquid is cooled and is pumped back toward the axial passage 2, in order to flow through the cooling element again.

The element 1 is designed to be stacked in a fuel cell block in such a manner that the direction 11 faces upward. The stack direction of the fuel cell block is therefore substantially parallel to the ground. On account of this stack direction, air bubbles which have passed into the space 7 collect in the upper region of the space 7. In this upper region, there are three radial passages 8c which connect the space 7 to the axial passage 4. The air bubbles can escape from the space into the axial passage 4 through these three radial passages 8c and can be guided through this axial passage 4 to a venting point. To ensure that the axial passage 4 does not receive too much cooling water, it is connected to the space 7 by only three radial passages 8c. Three further passages 9a, which face from the space 7 toward the axial passage 4, do not open out into the axial passage 4, but rather are configured as blind passages. No cooling liquid can flow through these radial passages 9a. This is ensured by a weld seam 10 which is arranged between the three blind passages 9a and the axial passage 4 and is responsible for ensuring that no cooling liquid is forced out of the end of the blind passages 9a through the two elements into the axial passage 4. In the element 1 illustrated in FIG. 1, the axial passage 4 is connected to the space by three radial passages 8c. If an element which is similar to the element 1 is fitted in such a manner that only a small amount of air can pass into the space 7, it is sufficient for the cross section of the axial passage 4 to be designed in such a manner that only one or two radial passages 8c connect the space 7 to the axial passage 4. The number of radial passages 8c which connect the space 7 to the axial passage 4 is therefore determined by the cross section of the radial passage 4 in the region of the element 1. It is equally conceivable for more than three radial passages 8c to be opened up in such a manner that they connect the space 7 to the axial passage 4, in order to improve flow through the space 7. During production of the element 1, this variation in the number of radial passages 8c which are open with respect to the axial passage 4 can easily be produced by correspondingly designing the cross section of the axial passage 4. The cross section of the axial passage 4 in the region of the element 1 is produced by simply cutting or stamping a piece of metal out of the element 1 in the desired shape of the cross section.

The production of elements, which are similar to the element 1, for a relatively large number of fuel cell blocks takes place, for example, in such a manner that the shape of the space 7 and of the radial passages 8a, 8b, 8c and 9a, 9b is introduced into the elements by deep-drawing. If appropriate, the element is also coated. In a further production step, in each case two elements 1 are welded together to form a cooling element along the intended lines 10, so that the space and the radial passages are formed between the elements. Alternatively, the elements may also be connected to one another by adhesive bonding or soldering. Finally, a seal is applied to the connected elements by vulcanization.

Up until this production step, all the elements are identical. Only in a further production step are the openings for the axial passages 2, 3, 4 and 5 introduced into the element 1, for example by stamping or cutting. This takes place in such a manner that a defined number of radial passages 8a, 8b, 8c which are prepared as blind passages are cut open in such a manner that, in the finished state of the cooling element, they connect the axial passages 2, 3 and 4 to the space 7 in the desired manner.

The axial passage 5 which leads through the element 1 is not connected to the space 7 by a single radial passage. Six blind passages 9b simply face from the space 7 toward the axial passage 5. The blind passages 9b end in the immediate vicinity of the axial passage 5. The distance between the end of the blind passages 9b and the axial passage 4 is, for example, 8 mm. The axial passage 5 is separated from the space in a gastight manner. This is achieved by a weld seam 10 which, in the finished state of the cooling element, runs around the axial passage 5.

At no point is the weld seam 10 interrupted by the cross section of the axial passage 5. The axial passage 5 is therefore available for carrying a gaseous or liquid medium which is independent of the cooling water. Without the axial passage 5, this medium would have to be carried through a pipe arranged outside the fuel cell block. Designing the axial passage 5 to be separate from the space 7 eliminates this external pipe and thereby saves space, which contributes to enabling the fuel cell block to be designed to be smaller.

Figure 2:
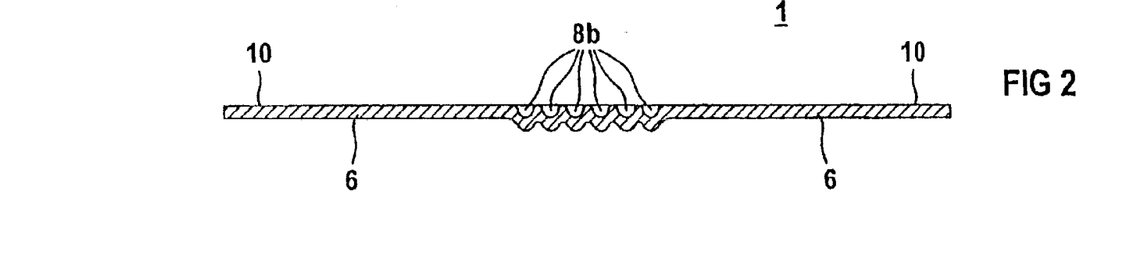
FIG. 2 shows a section through the element taken along the line II—II in FIG. 1.

FIG. 2 shows a section through the element 1 on line II—II illustrated in FIG. 1. The section line runs through the edge regions 6 and through six radial passages 8b which produce a connection between the axial passage 3 and the space 7.

Figure 3:
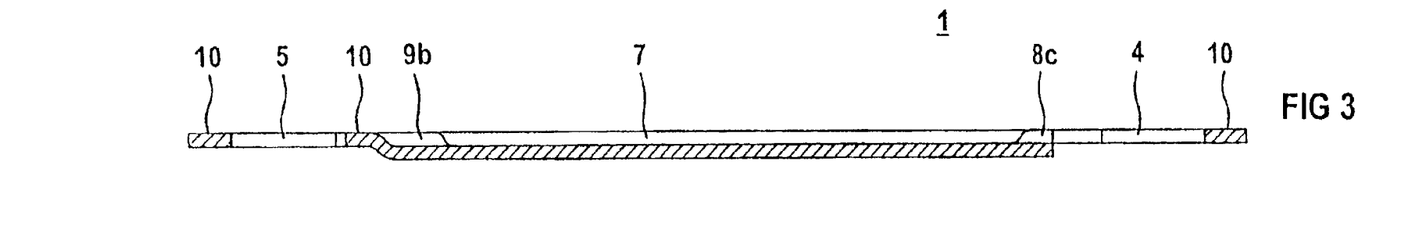
FIG. 3 shows a section through the element taken along the line III—III in FIG. 1.

FIG. 3 shows a section through the element 1 on the line which is denoted by III—III in FIG. 1. The section runs through the axial passage 5, which is separated in a gas-tight manner from the space 7 by the weld seam 10 which runs around it. The section continues through one of the blind passages 9b, the space 7 and one of the radial passages 8c which produce a connection between the space 7 and the axial passage 4.

Figure 4:
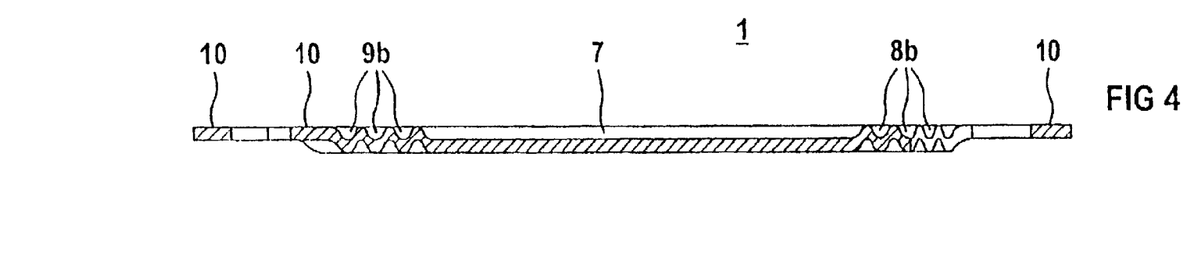
FIG. 4 shows a section through the element taken along the line IV—IV in FIG. 1.

FIG. 4 shows a section on line IV—IV illustrated in FIG. 1. This section runs through the axial passage 5, three blind passages 9b, the space 7, three radial passages 8b and the axial passage 3, which is connected to the space 7 by the radial passages 8b.

It can be seen from FIGS. 2, 3 and 4 that the space 7 and the radial passages 8 and blind passages 9 are designed as a recess in the element 1. The edge regions 6 and all the regions on which the weld seam 10 is prepared lie outside the recesses. These regions lie close to the further element, which, together with the element 1, when the fuel cell block is ready for operation, forms the space 7 and the radial passages 8a, 8b, 8c and blind passages 9a, 9b.

Figure 5:
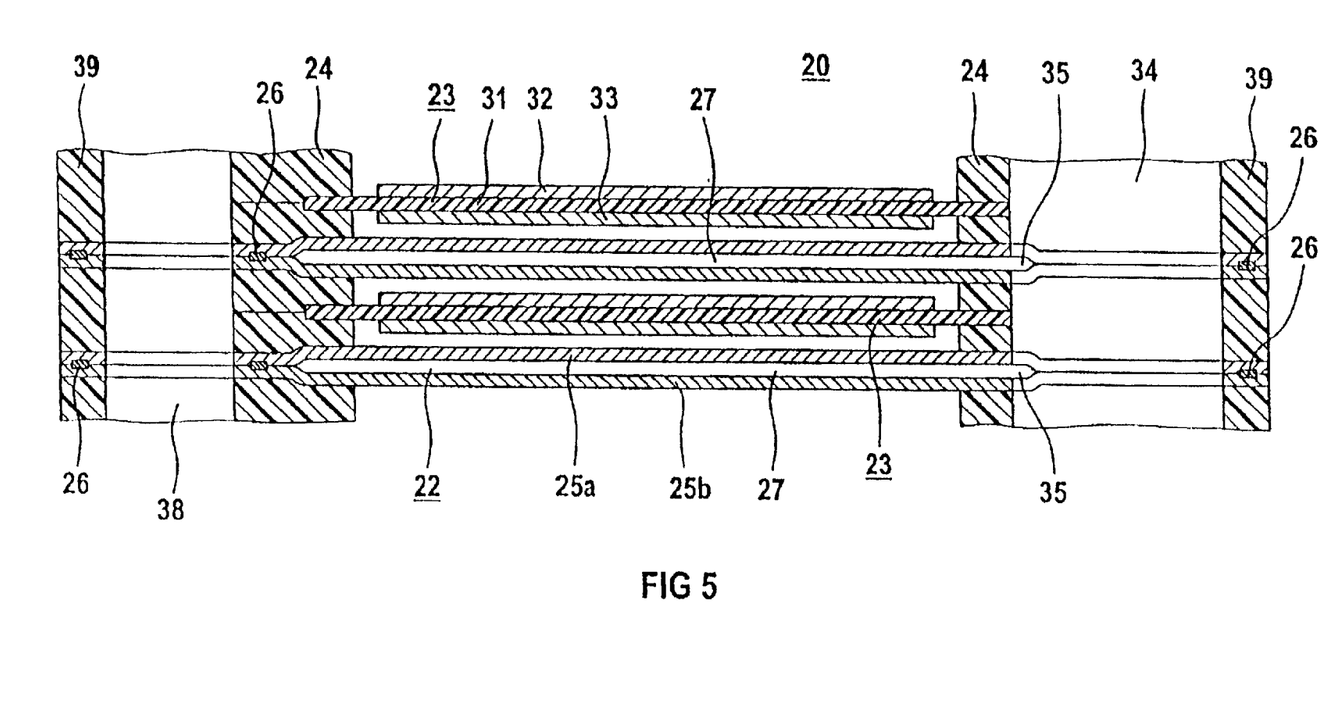
FIG. 5 shows part of a section through a fuel cell block.

FIG. 5 shows part of a section through a fuel cell block 20. A number of cooling elements 22 are stacked on top of one another alternately with a number of electrolyte-electrode elements 23 in this fuel cell block 20. The cooling element 22 and the electrolyte-electrode elements 23 are spaced apart from one another by seals 24. A cooling element 22 is composed of two elements 25a and 25b which are substantially symmetrical with respect to one another. The two elements 25a and 25b are connected to one another by weld seams 26 and between them form a space 27. An electrolyte-electrode element 23 comprises an electrolyte 31, on the planar side of which an anode 32 and a cathode 33 are arranged. The fuel cell block 20 also comprises an axial passage 34, which is designed for cooling liquid to flow through when the fuel cell block 20 is operating.

The axial passage 34 is connected to the spaces 27 between the elements 25a and 25b of the cooling element 22 in each case by radial passages 35. While the fuel cell block 20 is operating, cooling liquid flows out of the axial passage 34 through the radial passages 35 into the spaces 27 of the cooling element 22. The cooling liquid flows through the spaces 27 into a further axial passage of the fuel cell block 20, which is not illustrated in FIG. 5.

The fuel cell block 20 comprises a further axial passage 38 which is not connected to the spaces 27 of the cooling element 22. It is designed for an operating gas to flow through while the fuel cell block 20 is operating. The axial passage 34 and also the axial passage 38 are formed by the openings which are introduced in the outer region of the elements 25a and 25b, the seal 24 and a further seal 39, which is arranged in the outer region of the elements 25a and 25b of the fuel cell block 20.

Figure 6:
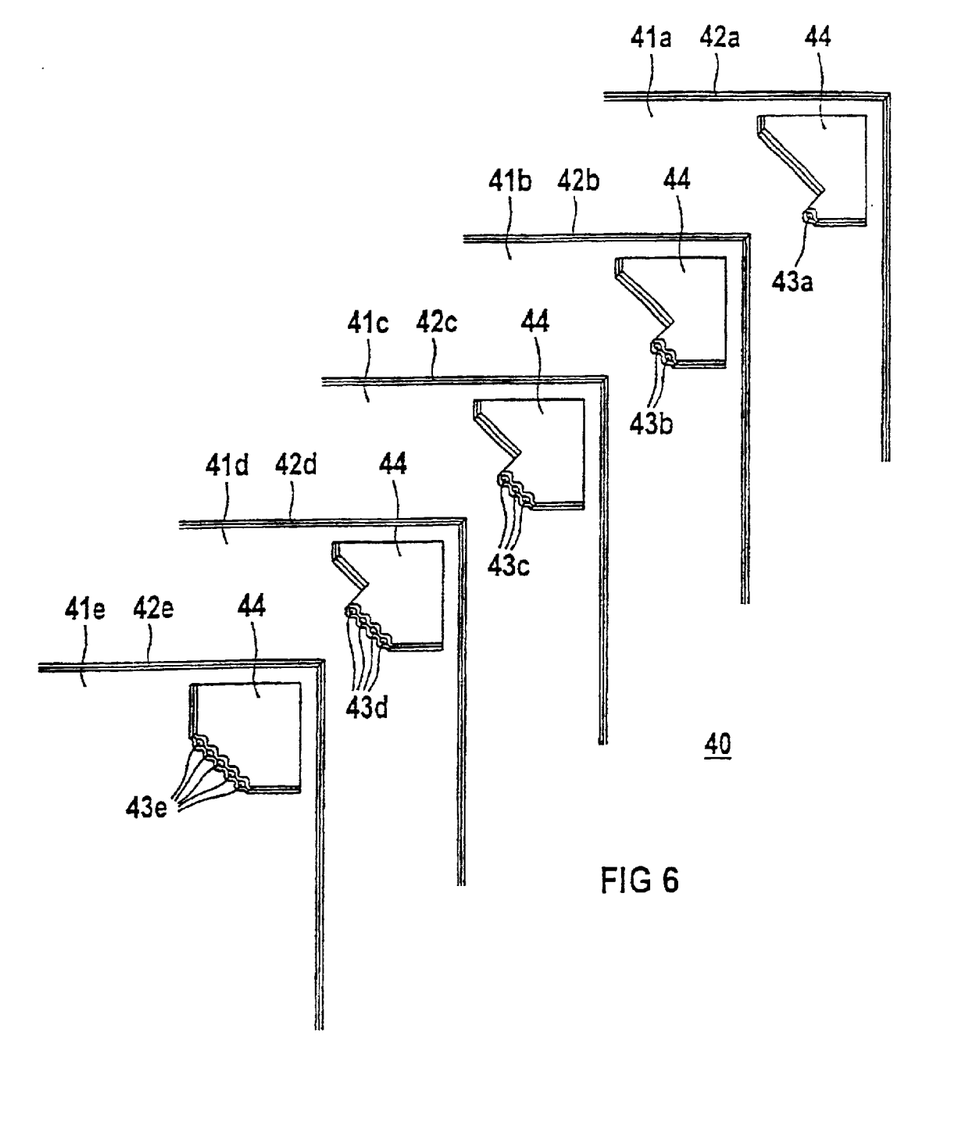
FIG. 6 shows an exploded illustration of a fuel cell block, with only elements of the same type being illustrated in part.

FIG. 6 shows, in the form of an exploded drawing, parts of five cooling elements 41a to 41e of a fuel cell block 40. The cooling elements 41a–e each comprise two elements 42a–e, which between them form a space which is not illustrated in FIG. 6. Moreover, the elements 42a–e between them in each case form a number of radial passages 43a–e and blind passages, which are not illustrated in further detail. The radial passages 43a–e connect an axial passage 44 to the space which is formed in each case between two adjacent elements 42a–e. In the assembled state of the fuel cell block 40, the axial passage 44 is formed by the openings in the elements 42a–e and seals which is in each case arranged between two adjacent cooling elements 41a–e in the outer region of the cooling elements 41a–e. The cross section of the axial passage 44 is different in the various cooling elements 41a–e. In the cooling element 41a, the cross section of the axial passage 44 is designed in such a way that only one radial passage 43a connects the space in this cooling element 41a to the axial passage 44. Further radial passages (not shown for reasons of clarity) facing from the space toward the axial passage 44 are designed as blind passages which end in the immediate vicinity of the axial passage 44. In the cooling elements 41b to 41e, the axial passage 44 is connected to the space in the corresponding cooling element by two, three, four and five radial passages 43a–e, respectively. In this way, the space in each of the cooling elements 41a–e illustrated is supplied with a different incoming flow of cooling agent through the axial passage 44.

Figure 7:
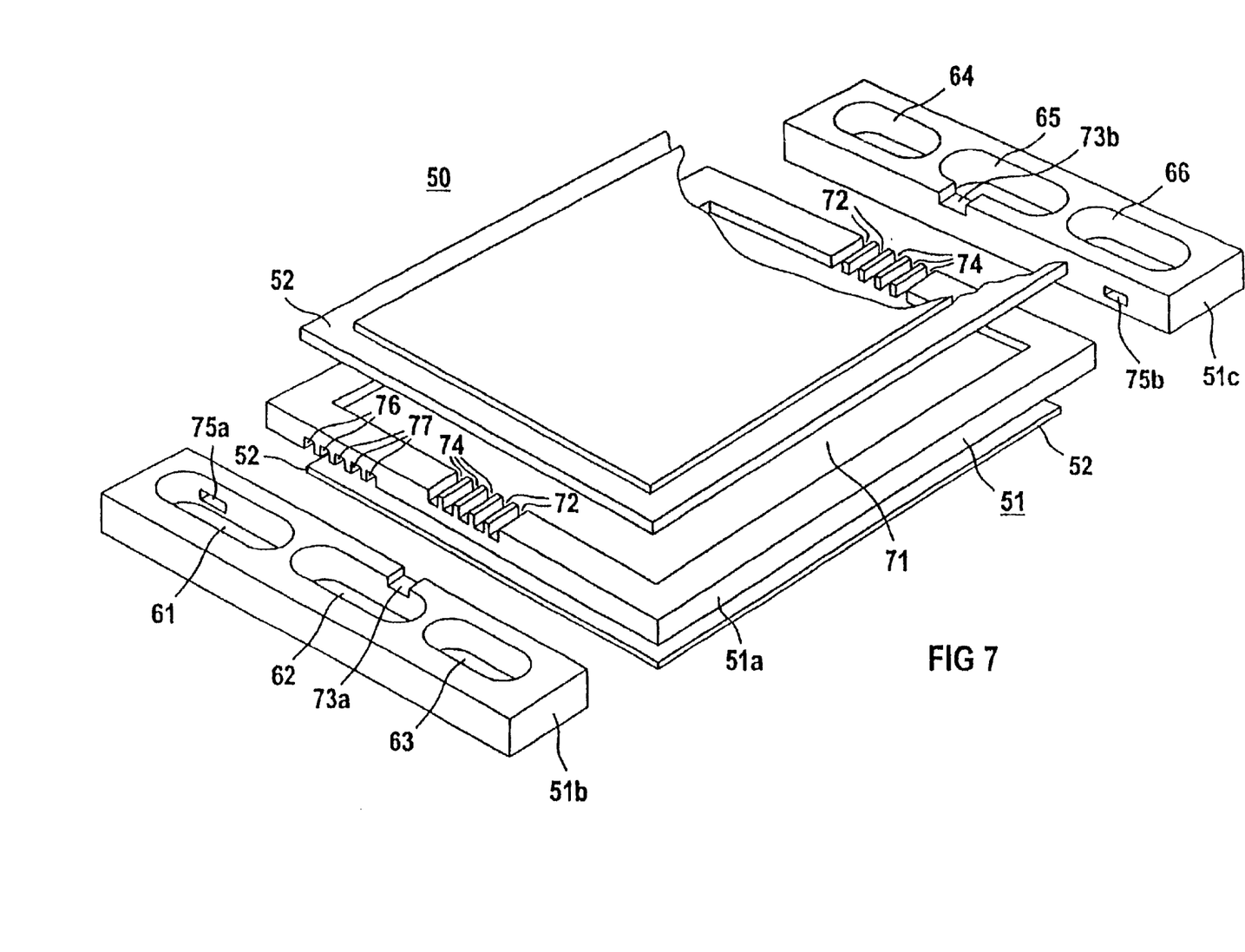
FIG. 7 shows an exploded illustration of a fuel cell.

FIG. 7 shows a fuel cell 50, which one element 51 and elements 52 arranged on both sides thereof which are designed as electrolyte-electrode assembly. The element 51 is composed of a central subelement 51a and two peripheral subelements 51b and 51c which adjoin the central subelement. The central subelement 51a is designed as a bipolar plate. In each case three axial passages run in the peripheral subelements 51b and 51c. When the fuel cell 50 is in the assembled state, the elements 52 bear tightly against the central subelement 51a and in each case form a space 71 together with this central subelement. One of the two spaces 71 can be seen in FIG. 7 arranged on the upper side of the central subelement 51a, whereas the second space is arranged on the underside of the central subelement 51a, and therefore cannot be seen in FIG. 7. The space 71 is connected to the axial passages 62 and 65 by a number of radial passages 72 which open out into the grooves 73a and 73b of the peripheral subelement 51b and 51c.

Alternatively, the radial passages 72, 74, 73a and 73b may be machined as bores into the central subelement 51a and/or into the peripheral subelements 51b and 51c. Radial passages of this type are not open at the top like the grooves and can therefore be sealed more easily.

In addition to the radial passages 72, there are in each case three further radial passages which are designed as blind passages 74. They are formed as a blind passage 74 when the peripheral subelements 51b and 51c bear tightly against the central subelement 51a, since the blind passages 74 do not open out into any groove in the peripheral subelements 51b, 51c, but rather end directly against the wall of the peripheral subelements 51b, 51c. The blind passages 74 are closed off by a seal, which is not illustrated in FIG. 7 and are arranged in each case between fuel cells 50 of a similar type stacked on top of one another. Even in the assembled state of the fuel cell 50, the upper one of the elements 52 does not completely cover the blind passages 74, but rather does so only partially.

When the fuel cell block 50 is operating, the space 71 is designed to carry an operating gas, for example air. The air flows through the axial passage 62 through the fuel cell block, which comprises a number of fuel cells 50 stacked on top of one another. The air flows out of the axial passage 62 through the groove 73a and onward through the radial passages 72 into the space 71. As it continues, it flows into the axial passage 65, which it reaches through the radial passages 72 and the groove 73b in the peripheral subelement 51c. The air is removed again from the fuel cell 50 through the axial passage 65. In the space 71, the air flows along an electrode of the element 52, which is designed as an electrolyte-electrode element and on the centrally arranged electrolyte of which the electrochemical reaction takes place, resulting in current being generated by the fuel cell 50.

When the fuel cell block is operating, a further operating gas, for example a hydrogen-containing gas, is fed through the axial passage 61. The operating gas passes through a passage 75a in the peripheral subelement 51b into the radial passages 76, which are connected to the space arranged on the underside of the central subelement 51a. The operating gas flows through this space and leaves the space again as a result of being able to pass through radial passages (not shown in more detail in FIG. 7) into the groove 75b, which guides the operating gas into the axial passage 66. As well as the radial passages 76, there are three further radial passages, which, like the blind passages 74, are designed as blind passages 77. Like the blind passages 74, in the assembled state of the fuel cell 50 the blind passages 77 end at the wall of the peripheral subelement 51b and are closed off by a seal which is arranged between the fuel cell 50 and a fuel cell which adjoins it. During production of a plurality of fuel cell blocks which are assembled from fuel cells corresponding to the fuel cell 50, the central sub-elements of each fuel cell can be produced completely identically. The mass production of identical central sub-elements is significantly less expensive than the production of a large number of central subelements which are in each case of different design. If the fuel cells have different demands for the incoming and outgoing flow of operating gas, only the grooves 73b, 73c are designed to be of different width in the peripheral subelements 51b and c. Different numbers of radial passages 72 are opened up according to the width of the grooves 73b, 73c. This variation can be carried out at a very low cost.

We claim:

1. A fuel cell block, comprising:
a stack formed of a plurality of elements and axial passages formed through said elements in a stack direction;
at least two adjacent said elements defining a space therebetween and a plurality of radial passages, communicating with said space and being formed between said two elements or in one of said two elements;
a plurality of said radial passages connecting said space to at least one of said axial passages for exchanging fluid medium between said at least one axial passage and said space, and at least one of said radial passages forming a blind passage not forming a connection to a respective said axial passage.

2. The fuel cell block according to claim 1, wherein said blind passage ends in an immediate vicinity of the respective said axial passage.

3. The fuel cell block according to claim 1, wherein a distance between a blind end of said blind passage and said axial passage is 1 mm to 50 mm.

4. The fuel cell block according to claim 2, wherein said axial passage is connected to said space by at least one radial passage.

5. The fuel cell block according to claim 2, wherein said axial passage is not connected to a respective said radial passage and is separated in a gastight manner from said space.

6. The fuel cell block according to claim 5, wherein said axial passage is separated in a gastight manner from all said spaces formed between two adjacent said elements of the fuel cell block.

7. The fuel cell block according to claim 1, wherein said elements forming said space each include a central subelement and at least one peripheral subelement, and wherein said axial passages extend through said peripheral subelement.

8. The fuel cell block according to claim 1, wherein at least one of said axial passages is formed with different cross sections in different elements of a same type.

9. The fuel cell block according to claim 1, wherein said elements forming said space are two mutually interconnected metallic plates.

10. The fuel cell block according to claim 9, wherein said plates are connected to one another by at least one weld seam.

11. The fuel cell block according to claim 10, wherein a weld seam is disposed between an respective said axial passage and an end of said blind passage.

12. The fuel cell block according to claim 11, which comprises a weld seam extending around said axial passage and gas-tightly separating said axial passage from said space.

13. The fuel cell block according to claim 9, wherein said plates form a cooling element.

14. The fuel cell block according to claim 1, wherein said apace as configured to carry cooling water during operation of the fuel cell block.

15. The fuel cell block according to claim 1, wherein said space is configured to carry an operating gas during operation of the fuel cell block.

16. A fuel cell block, comprising:
a stack formed of a plurality of elements and axial passages formed through said elements in a stack direction;
at least two adjacent said elements defining a space the therebetween;
said elements defining a plurality of radial passages including radial passages fluidically connecting said space with at least one of said axial passages for exchanging fluid medium between said axial passage and said space, and at least one blind radial passage that is closed and does not form a fluidic connection between said space and one of said axial passages.

17. The fuel cell block according to claim 1, wherein said blind passage is a passage to be opened to the respective said axial passage.

18. The fuel cell block according to claim 16, wherein said blind passage is a passage to be opened to the respective said axial passage.

* * * * *